United States Patent Office 3,423,954
Patented Jan. 28, 1969

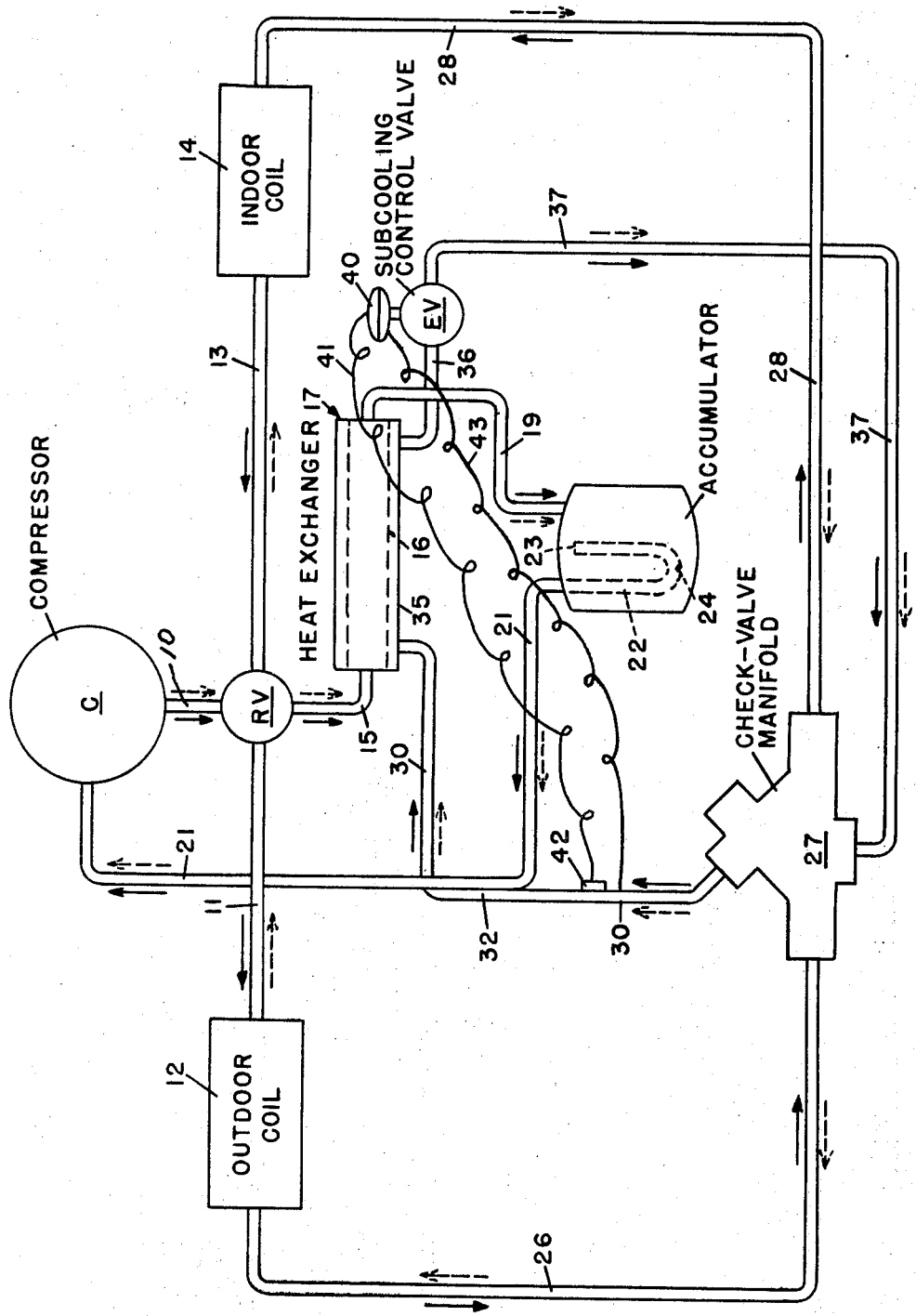

3,423,954
REFRIGERATION SYSTEMS WITH ACCUMULATOR MEANS
James R. Harnish, Adrian, Mich., and Byron L. Lessley, Staunton, Va., assignors to Westinghouse Electric Corporation, Pittsburgh, Pa., a corporation of Pennsylvania
Filed Nov. 13, 1967, Ser. No. 682,149
U.S. Cl. 62—222  8 Claims
Int. Cl. F25b 17/00, 13/00, 41/00

ABSTRACT OF THE DISCLOSURE

A refrigeration system has a compressor, a condenser, a liquid tube, a subcooling control valve operating as an expansion valve, an evaporator, a heat exchanger providing heat exchange between the liquid flowing through the liquid tube and the refrigerant flowing from the evaporator, an accumulator, and a suction gas tube connected in series in the order named. The liquid tube has a portion in heat exchange contact with a portion of the suction gas tube. The heat exchange between the high pressure liquid and the suction gas, between the high pressure liquid and the refrigerant flowing from the evaporator, and the operation of the subcooling control valve provide a large amount of subcooling of the refrigerant liquid, greatly increasing its refrigerating effect so that the evaporator is overfed with refrigerant liquid flowing from it into the heat exchanger where it is evaporated by heat from the high pressure liquid.

Field of the invention

The field of the invention is refrigeration systems in which evaporators are fed by modulating expansion valves. Thermostatic expansion valves are the most widely used modulating expansion valves. They respond to superheat in the suction gas, and operate to prevent refrigerant liquid from flowing from evaporators, some of the evaporator surface being used to superheat the gas leaving an evaporator. In multizone, direct expansion, air cooling systems, as well as in other systems having varying air flow over evaporator coils, at reduced air flow, refrigerant distribution through the evaportors becomes poor so that a thermostatic expansion valve cannot operate properly. Another disadvantage of a thermostatic expansion valve is that when used with a condenser coil cooled by outdoor air, at low outdoor temperatures, the condensing pressure is insufficient to operate the expansion valve properly.

The U.S. Patent No. 3,264,837 discloses a system which uses a subcooling control valve as an expansion valve, and which has none of the faults of a system using a thermostatic expansion valve. There is a large amount of subcooling of the refrigerant liquid so that the evaporator of the system is overfed with all of its internal surface thoroughly wetted with increased heat transfer and efficiency. An accumulator is used to store the refrigerant liquid flowing from the evaporator, and a heat exchange coil within the accumulator through which the high pressure liquid flows, evaporates with heat from that liquid the excess refrigerant liquid flowing from the evaporator into the accumulator. We have found that with such a heat exchange coil within such an accumulator, there is a large amount of ebullition of the liquid within the accumulator which increases the volume requirements of the latter to store a given amount of liquid. In the present invention, a heat exchange coil within an accumulator is not used, the evaporation of the refrigerant liquid flowing from the evaporator being accomplished within an external heat exchanger located between the evaporator and the accumulator, with heat from the high pressure liquid. This permits the liquid within the accumulator to be a quiescent body, and permits the storing of a larger quantity of liquid within a given size accumulator. Also, since a level of refrigerant liquid is not required within the accumulator to cover a heat exchange coil, the required refrigerant charge is less. The external heat exchanger is easier to fabricate than is a heat exchange coil within an accumulator, and its cost is less.

Summary of the invention

A refrigeration system consists of a compressor, a condenser, a liquid tube, a portion of a heat exchanger, a subcooling control valve operating as an expansion valve, an evaporator, another portion of the heat exchanger, an accumulator, and a suction gas tube connected in series in the order named. The liquid tube has a portion in heat exchange contact with the suction gas tube. A large amount of subcooling of the refrigerant liquid results from the heat exchange contact of the liquid tube with the suction gas tube, from the heat exchange within the heat exchanger between the high pressure liquid and the refrigerant flowing from the evaporator, and from the operation of the subcooling control valve. Heat from the high pressure liquid flowing through the heat exchanger evaporates refrigerant liquid flowing from the evaporator. Heat from the high pressure liquid flowing through the portion of the liquid tube in heat exchange contact with the suction gas tube, evaporates any refrigerant liquid flowing from the accumulator into the suction gas tube.

The large amount of subcooling greatly increases the refrigerating effect, resulting in overfeeding the evaporator so that all of its internal surface is thoroughly wetted with refrigerant liquid, with increased heat transfer and efficiency. The subcooling prevents the evaporator from being starved at low outdoor temperatures. When the system is a heat pump, the accumulator absorbs the surges that occur when the flow of refrigerant is reversed. At no time does any refrigerant liquid enter the compressor.

Brief description of the drawing

The drawing is a diagrammatic view of a heat pump embodying this invention.

Description of the preferred embodiment of the invention

Referring to the drawing, a refrigerant compressor C is connected by discharge gas tube 10 to reversal valve RV which is connected by tube 11 to outdoor coil 12, and by tube 13 to indoor coil 14. The valve RV is connected by tube 15 to one end of larger tube 16 of heat exchanger 17. The other end of the tube 16 is connected by tube 19 to the top of accumulator 20. The top of the accumulator 20 is also connected by suction gas tube 21 to the suction side of the compressor C. The tube 21 has a U-shaped portion 22 within the accumulator 20, with an open top 23, and with an oil bleed hole 24 in its bottom. The outdoor coil 12 is connected by tube 26 to check-valve manifold 27 which is connected by tube 28 to the indoor coil 14. The manifold 27 is connected by liquid tube 30 having a portion 32 in heat exchange contact with the suction gas tube 21, to one end of shell 35 of the heat exchanger 17. The shell 35 extends around the tube 16. The other end of the shell 35 is connected by tube 36 to the inlet of expansion valve EV which is a subcooling control valve. The outlet of the valve EV is connected by tube 37 to the manifold 27. The latter is fully disclosed in the U.S. Patent No. 2,299,661.

The subcooling control valve EV has a diaphragm chamber 40, the outer portion of which is connected by capillary tube 41 to thermal bulb 42 in heat exchange contact with the liquid tube 30 upstream of the portion 32 of the latter, and the inner portion of which is connected by capillary equalizer tube 43 to the interior of the tube 30 upstream of the portion 32 of the latter, although the valve EV could be internally equalized. The details of the valve EV, and its operation are fully disclosed in the previously mentioned Patent No. 3,264,837. The valve EV responds through the capillary tube 41 and the thermal bulb 42 to the temperature of the refrigerant liquid entering the liquid tube 30, and responds through the capillary tube 43 to the pressure of that liquid. The valve EV meters refrigerant to the coil 14 or 12 operating as an evaporator coil, at the rate at which the refrigerant is condensed within the coil 12 or 14 operating as a condenser coil, while maintaining a predetermined amount of subcooling of the refrigerant liquid, which may be 10° F. subcooling at a condensing temperature of 100° F., by backing up more liquid within the coil operating as a condenser coil, to increase the subcooling, and vice versa. The system is overcharged with refrigerant so that there is always a quantity of refrigerant liquid within the tubes 15 and 16.

The system is so designed that during normal cooling operation, the refrigerant liquid flowing from the coil 14 operating as an evaporator coil, is evaporated within the heat exchanger 17. The characteristics of the subcooling control valve EV are such that at times such as at start-up, it, in seeking a balance point, will supply more refrigerant liquid to the coil operating as an evaporator coil than can be evaporated within the latter and within the heat exchanger 17. At such times, refrigerant liquid will flow into the accumulator 20. During heating operation, since the refrigerant charge is selected for the greater cooling load during cooling operation, at times, more refrigerant liquid is supplied to the coil 12 operating as an evaporator coil than can be evaporated within the latter and within the heat exchanger 17. At such times, refrigerant liquid will flow into the accumulator 20. The refrigerant liquid within the accumulator 20 will be induced by the flow of suction gas through the suction gas tube portion 22, through the oil bleed hole 24, into the suction gas tube 21 where it will be evaporated by heat from the high pressure liquid flowing through the liquid tube portion 32 in heat exchange contact with the suction gas tube 21.

*Cooling operation*

The solid-line arrows alongside the tubes on the drawing show the direction of refrigerant flow during cooling operation. The compressor C supplies discharge gas through the tube 10, the reversal valve RV, and the tube 11 into the outdoor coil 12 operating as a condenser coil. Refrigerant liquid flows from the coil 12 through the tube 26 into the manifold 27, and from the latter through the tube 30, the shell 35 of the heat exchanger 17, and the tube 36 into the subcooling control valve EV. Expanded refrigerant flows from the valve EV through the tube 37, the manifold 27, and the tube 28 into the indoor coil 14 operating as an evaporator coil. Gas and unevaporated refrigerant liquid flow from the coil 14 through the tube 13, the reversal valve RV, and the tube 15 into the tube 16 of the heat exchanger 17, within which, during normal operation, the excess refrigerant liquid is evaporated by heat from the high pressure liquid flowing through the shell 35 of the heat exchanger 17, the high pressure liquid being subcooled by this heat exchange. Gas flows from the tube 16 through the tube 19 into the accumulator 20, and from the latter through the suction gas tube 21 to the suction side of the compressor C. When at times, such as at start-up, as previously explained, the subcooling control valve EV supplies more refrigerant liquid to the coil 14 than can be evaporated within the latter and within the heat exchanger 17, refrigerant liquid flows from the tube 16 through the tube 19 into the accumulator 20. Such liquid flows through the oil bleed hole 24 into the suction gas tube 21 where it is evaporated by heat from the high pressure liquid flowing through the liquid tube portion 32 in heat exchange contact with the suction gas tube 21, the high pressure liquid being further subcooled by this heat exchange.

*Heating operation*

The dashed-line arrows alongside the tubes on the drawing show the direction of refrigerant flow during heating operation. The compressor C supplies discharge gas through the tube 10, the reversal valve RV, and the tube 13 into the indoor coil 14 operating as a condenser coil. Refrigerant liquid flows from the coil 14 through the tube 28, the manifold 27, the tube 30, the shell 35 of the heat exchanger 17, and the tube 36 into the subcooling control valve EV. Expanded refrigerant flows from the valve EV through the tube 37 into the manifold 27, and from the latter through the tube 26 into the outdoor coil 12 operating as an evaporator coil. Gas and unevaporated refrigerant liquid flow from the coil 12 through the tube 11, the valve RV, and the tube 15 into the tube 16 of the heat exchanger 17. Since, as previously explained, the refrigerant charge within the system is that for satisfactory cooling operation, it is too large for heating operation, so that more refrigerant liquid will flow from the coil 12 into the tube 16 of the heat exchanger 17 than can be evaporated therein, with the excess refrigerant liquid flowing into the accumulator 20. The refrigerant liquid that is evaporated within the heat exchanger 17 subcools the high pressure liquid. Refrigerant liquid flows from the accumulator 20 through the oil bleed hole 24 into the suction gas tube 21 where it is evaporated by heat from the high pressure liquid flowing through the liquid tube portion 32 in heat exchange contact with the suction gas tube 21, the high pressure liquid being further subcooled by this heat exchange.

During both cooling and heating operation, the large amount of subcooling greatly increases the refrigerating effect so that the coil operating as an evaporator coil can be overfed by a substantial amount without requiring a liquid pump. The subcooling control valve EV meters refrigerant to the coil operating as an evaporator coil at the rate at which refrigerant is evaporated within the latter, within the heat exchanger 17, and within the suction gas tube 21.

We claim:
1. A refrigeration system comprising a compressor, a condenser, first heat exchange means, an expansion valve, an evaporator, second heat exchange means, accumulator means, and a suction gas tube connected in series in the order named, said system being overcharged with refrigerant so that there is always a quantity of refrigerant liquid within said second heat exchange means, and means for adjusting said expansion valve to overfeed said evaporator so that gas and refrigerant liquid flow from the latter into said second heat exchange means, said heat exchange means being arranged to evaporate with heat from the high pressure liquid flowing through said first heat exchange means, refrigerant liquid flowing from said evaporator into said second heat exchange means, said high pressure liquid being subcooled by this heat exchange.

2. A system as claimed in claim 1 in which means is provided for feeding liquid from said accumulator means into said suction gas tube, and in which means is provided for providing heat exchange between said high pressure liquid flowing from said condenser into said first heat exchange means and the refrigerant flowing through said suction gas tube for evaporating with heat from said high pressure liquid refrigerant liquid flowing within said suction gas tube, said high pressure liquid being further subcooled by this heat exchange.

3. A system as claimed in claim 2 in which said expansion valve is a subcooling control valve, and in which said means for adjusting said expansion valve comprises means responsive to the temperature and the pressure of said high pressure liquid flowing from said condenser into said first heat exchange means.

4. A system as claimed in claim 1 in which said expansion valve is a subcooling control valve, and in which said means for adjusting said expansion valve comprises means responsive to the temperature and the pressure of said high pressure liquid flowing from said condenser into said first heat exchange means.

5. A heat pump comprising a refrigerant compressor, reversal means, a discharge gas tube connecting said means to the discharge side of said compressor, an outdoor coil, a second tube connecting said means to said coil, an indoor coil, a third tube connecting said means to said indoor coil, accumulator means, an expansion valve, means including a liquid tube and first heat exchange means for connecting the one of said coils that is operating as a condenser coil to the inlet of said expansion valve, means including a fifth tube and second heat exchange means for connecting said reversal means to said accumulator means, a suction gas tube connecting said accumulator means to the suction side of said compressor, means including a seventh tube for connecting the outlet of said expansion valve to the one of said coils that is operating as an evaporator coil, said reversal means in cooling position routing discharge gas through said second tube to said outdoor coil operating as a condenser coil, and routing refrigerant from said indoor coil operating as an evaporator coil through said third and fifth tubes and said second heat exchange means into said accumulator means, said reversal valve in heating position routing discharge gas through said third tube into said indoor coil operating as a condenser coil, and routing refrigerant from said outdoor coil operating as an evaporator coil through said second and fifth tubes and said second heat exchange means into said accumulator means, said heat pump being overcharged with refrigerant so that there is always a quantity of refrigerant liquid within said second heat exchange means, and means for adjusting said expansion valve to overfeed the one of said coils that is operating as an evaporator coil so that refrigerant liquid and gas flow into said fifth tube and said second heat exchange means, said heat exchange means being arranged to evaporate with heat from the high pressure liquid flowing through said first heat exchange means refrigerant liquid flowing into said second heat exchange means, said high pressure liquid being subcooled by this heat exchange.

6. A heat pump as claimed in claim 5 in which means is provided for feeding liquid from said accumulator means into said suction gas tube, and in which means is provided for providing heat exchange between the high pressure liquid flowing into said liquid tube and the refrigerant flowing through said suction gas tube for evaporating with heat from said high pressure liquid refrigerant liquid flowing within said suction gas tube, said high pressure liquid being further subcooled by this heat exchange.

7. A heat pump as claimed in claim 6 in which said expansion valve is a subcooling control valve, and in which said means for adjusting said expansion valve comprises means responsive to the temperature and the pressure of the liquid flowing into said liquid tube.

8. A heat pump as claimed in claim 5 in which said expansion valve is a subcooling control valve, and in which said means for adjusting said expansion valve comprises means responsive to the temperature and the pressure of the liquid flowing into said liquid tube.

References Cited
UNITED STATES PATENTS

| 3,171,262 | 3/1965 | Harnish | 62—160 |
| 3,357,198 | 12/1967 | Harnish | 62—160 |
| 3,324,671 | 6/1967 | Harnish | 62—324 |

MEYER PERLIN, *Primary Examiner.*

U.S. Cl. X.R.

62—160, 324, 503, 513